United States Patent
Austin

[19]

[11] Patent Number: 6,095,546
[45] Date of Patent: Aug. 1, 2000

[54] TRAILER HITCH COVER AND ACCESSORY COMPONENTS

[75] Inventor: Barry G. Austin, Marshall, Mich.

[73] Assignee: Tekonsha Engineering Company, Tekonsha, Mich.

[21] Appl. No.: 08/984,119

[22] Filed: Dec. 3, 1997

[51] Int. Cl.[7] .................................................. B60D 1/00
[52] U.S. Cl. ............................................................ 280/507
[58] Field of Search .................................. 280/500, 504, 280/507; 24/634, 113 MP; 138/89; 150/166; 293/120; 174/50, 52.1, 61

[56] References Cited

U.S. PATENT DOCUMENTS

| | | | |
|---|---|---|---|
| D. 349,083 | 7/1994 | Hall ........................................ | D12/162 |
| 2,342,907 | 2/1944 | Stall ........................................ | 293/55 |
| 3,271,050 | 9/1966 | Saunders ................................. | 280/507 |
| 3,782,761 | 1/1974 | Cardin, Sr. ............................. | 280/507 |
| 4,040,641 | 8/1977 | Riecke .................................... | 280/507 |
| 4,509,770 | 4/1985 | Young et al. ........................... | 280/507 |
| 4,738,464 | 4/1988 | Putnam ................................... | 280/500 |
| 4,852,902 | 8/1989 | Young et al. ........................... | 280/507 |
| 5,094,469 | 3/1992 | Yamamoto et al. .................... | 280/500 |
| 5,560,631 | 10/1996 | Salvo ..................................... | 280/507 |
| 5,628,536 | 5/1997 | Fulkerson .............................. | 293/117 |
| 5,775,560 | 7/1998 | Zahn ...................................... | 224/524 |

FOREIGN PATENT DOCUMENTS 2197522 of 0000 Canada .

OTHER PUBLICATIONS

Catalog Sheet Entitled Electrical/4–Way Flat Plugs & Adapters Showing Commercially Available Products (undated).
Catalog Sheet Entitled Electrical Mounting Access Showing Commercially Available Products (undated).

*Primary Examiner*—Christopher P. Schwartz
*Assistant Examiner*—C T Bartz
*Attorney, Agent, or Firm*—Price, Henveld, Cooper, DeWitt & Litton

[57] ABSTRACT

A trailer hitch cover system for use with vehicle-mounted trailer towing hitches having a crossbar includes at least one cover segment adapted to at least partially cover the trailer hitch crossbar and includes an accessory mount. The system further includes means for securing the cover segment to the trailer hitch crossbar, and at least one accessory mountable on the accessory mount.

11 Claims, 3 Drawing Sheets

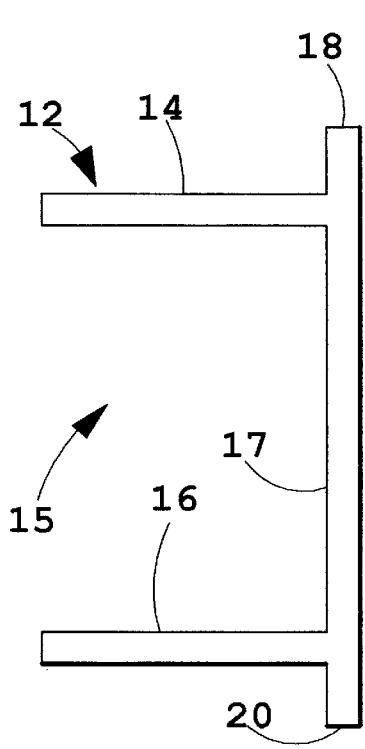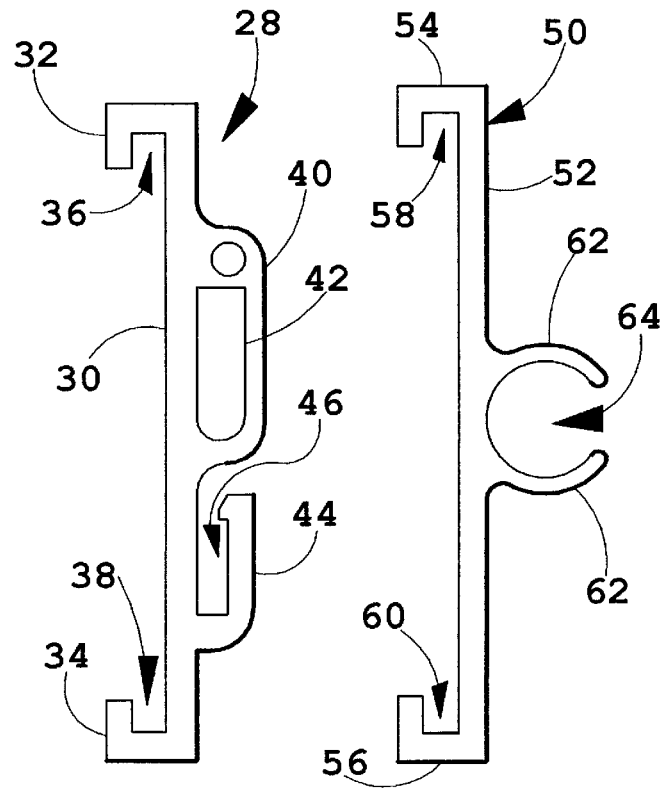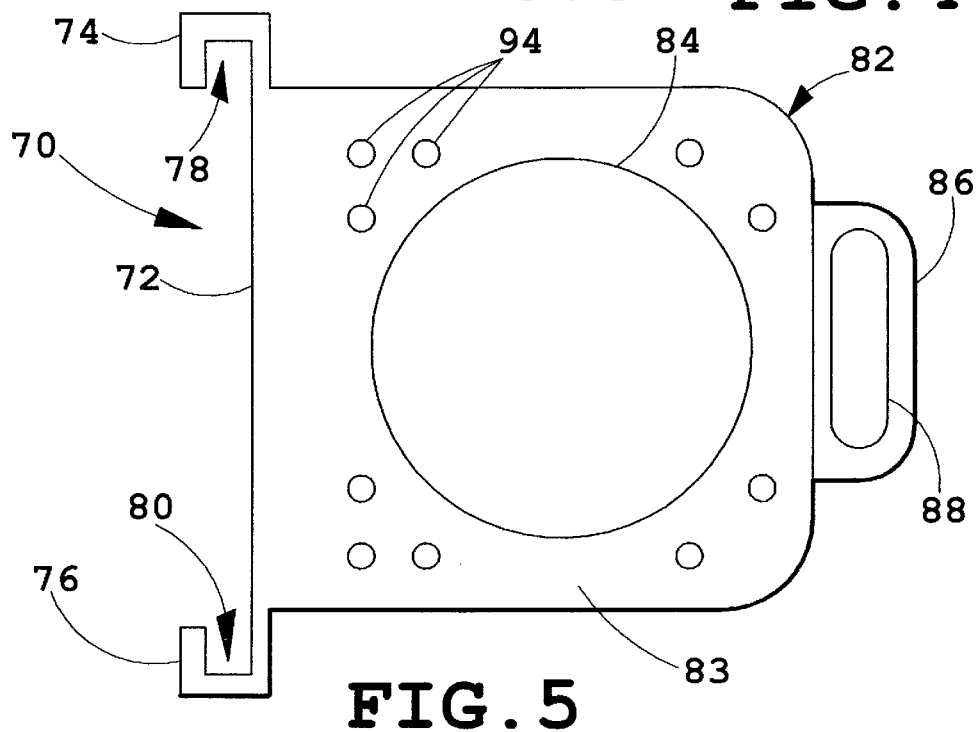

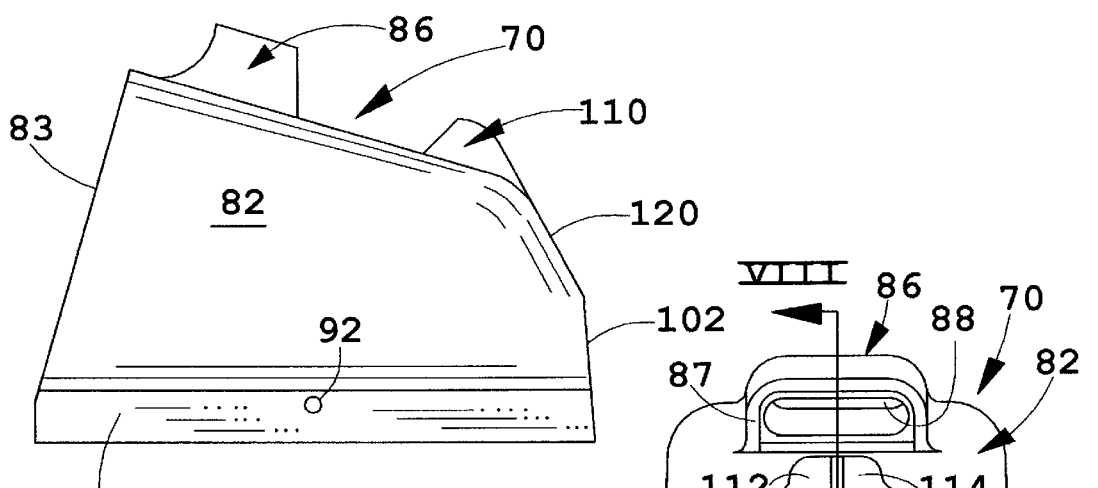
FIG. 6
FIG. 7
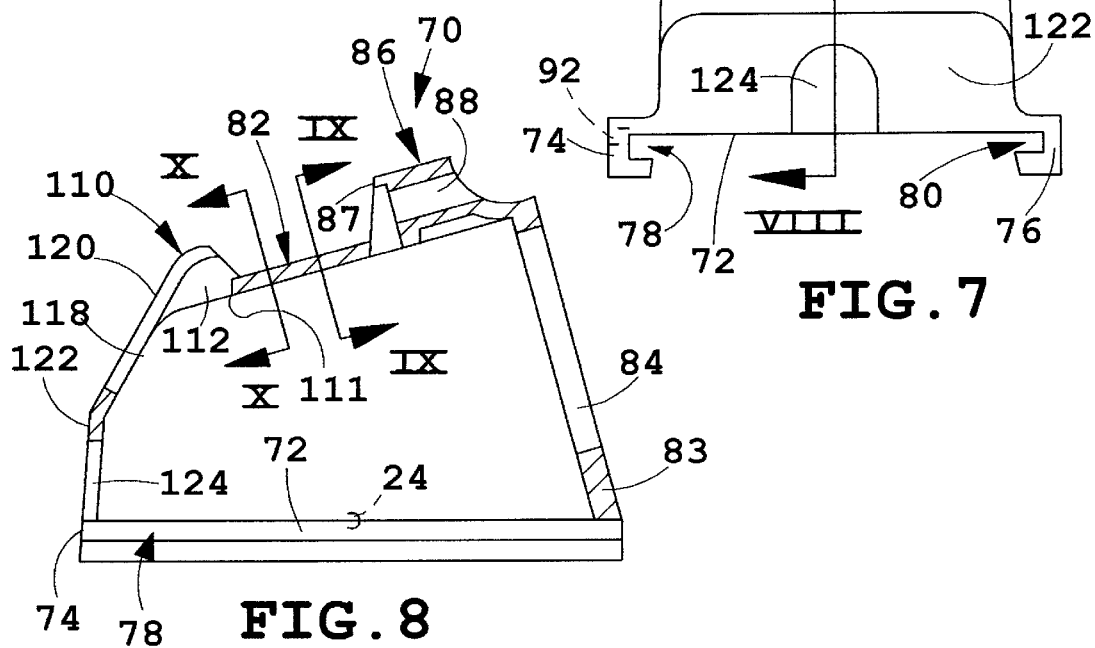
FIG. 8
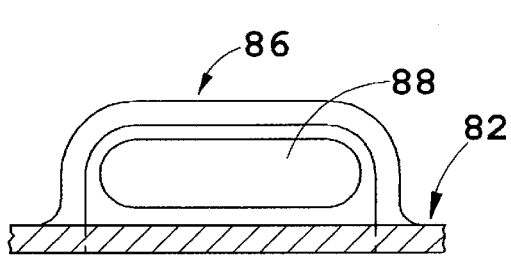
FIG. 9
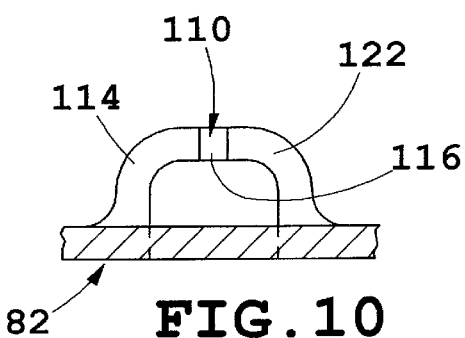
FIG. 10

6,095,546

1

TRAILER HITCH COVER AND ACCESSORY COMPONENTS

BACKGROUND OF THE INVENTION

The present invention relates to trailer hitch covers and, more particularly, to a cover for the crossbar of a vehicle-mounted trailer hitch, together with a novel group of interchangeably usable accessory components which are integrally mountable upon such cover.

Motor vehicles are typically outfitted with a towing hitch to facilitate the pulling of general purpose trailers, other motor vehicles, recreational vehicles, trailerable homes, or the like. These trailer hitches generally have a crossbar (torsion tube) positioned substantially at the rear of the vehicle which is also readily visible when looking at the vehicle rear profile. Since the hitch is located substantially beneath the vehicle, it is subjected to an environment which includes water, dust, snow, road salts, and the like. Such exposure rapidly deteriorates the painted surface of the typically steel hitch structure, and within a short while rust and corrosion appears, thus detracting from the aesthetics of the vehicle.

A requirement for towing a trailer or vehicle is that, depending upon the configuration of the trailer or vehicle being towed, electrical signals to energize brakes, brake lights, running lights, turn signal lights, and power for various accessory devices, must be transmitted from the towing vehicle to the towed trailer or vehicle. To accomplish this, electrical conductors which are typically housed in a cable are routed to the rear of a vehicle and terminate at a connector located at or near the trailer hitch of the towing vehicle. Such connectors have internal contact configurations which are typically a standard throughout the industry to facilitate the connecting of an oppositely configured connector, which is part of the towed vehicle or trailer. The tow-vehicle connectors are sometimes mounted to the vehicle bumper or to some other structure at the rear of the vehicle. Alternatively, the tow-vehicle connector and cable are sometimes left unattached and simply terminate at the rear of the vehicle, with sufficient length to reach the mating connector and cable of the trailer or towed vehicle. When not in use, they must somehow be anchored but no means are provided for doing that.

While various covers are, as a general matter, known in the art for application to the trailer hitch rear crossbar, there is a need for a system to not only mask and protect the trailer crossbar (torsion tube) but, in addition, to provide safe, reliable, and protective mounting and storage for the cables and connectors associated with towing.

SUMMARY OF THE INVENTION

One aspect of the present invention is a trailer hitch cover system for use with vehicle-mounted trailer towing hitches having a rear crossbar. The trailer hitch cover system of the invention includes at least one cover segment adapted to at least partially cover the trailer hitch crossbar, and this component incorporates or provides an accessory mount. The system includes means for securing the cover segment to the trailer hitch crossbar, and includes certain novel and useful accessories which cooperatively and selectively engage and are retained upon the accessory mount.

Another aspect of the invention is a trailer hitch cover for use with vehicle-mounted trailer towing hitches having a rear crossbar comprising a cover segment adapted to cover substantial portions of the trailer hitch crossbar and including means for securing the cover segment to the trailer hitch crossbar.

2

These and other features, advantages and objects of the present invention will be further understood and appreciated by those skilled in the art by reference to the following specification, claims and appended drawings.

BRIEF DESCRIPTION OF THE DRAWINGS

FIG. 2 is an end view of the trailer hitch cover segment shown in FIG. 1;

FIG. 3 is a side elevational view of a connector storage accessory for the storage of a "flat four" receptacle;

FIG. 4 is an end view of a cable retention bracket;

FIG. 5 is an end view of a preferred connector mounting bracket and housing for a standard 7-pin or other such multiple-contact connector, which also includes a storage mount for a "flat four"-type plug;

FIG. 6 is a top view of the apparatus shown in FIG. 5;

FIG. 7 is an end view of the apparatus shown in FIG. 5, as seen from the opposite end;

FIG. 8 is a cross-sectional view taken along the plane VIII—VIII of FIG. 7;

FIG. 9 is a cross-sectional view taken along the plane IX—IX of FIG. 8; and

FIG. 10 is a cross-sectional view taken along the plane X—X of FIG. 8.

DETAILED DESCRIPTION OF THE PREFERRED EMBODIMENT

Figure 1:
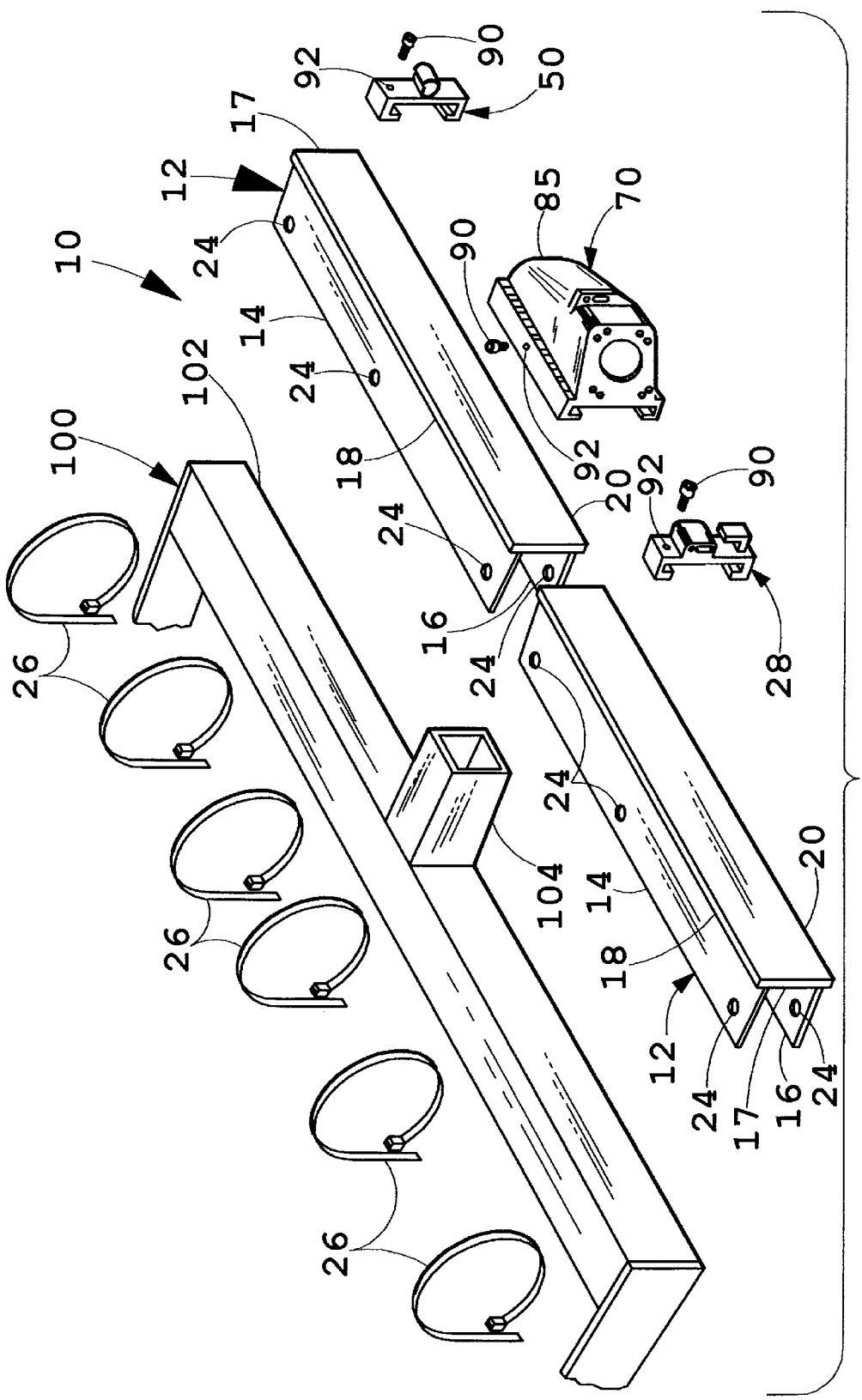
FIG. 1 is a perspective exploded view of a trailer hitch cover system embodying the present invention which includes a hitch crossbar cover having a connector mount and cable retention accessories adapted to be mounted on the cover.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIGS. 1–5 show a trailer hitch crossbar cover system 10, which is one of the preferred embodiments of the present invention, and illustrates its various components.

The general configuration of the trailer hitch cover system 10, most easily seen in FIG. 1, includes at least one cover segment 12 for covering crossbar 102 of trailer hitch 100. Cover segment 12 is typically formed of an extrudable plastic, such as nylon, which is easily trimmed to shape by the user. Cover segment 12 can be custom cut to a desired length and configuration to match any unusual or particular aspects of trailer hitch 100, such as conforming to tow bar 104 or chain plate rings (not shown).

As shown in end view in FIG. 2, cover segment 12 generally comprises a vertical web 17 and two substantially horizontally disposed parallel flanges or legs, upper leg 14 and lower leg 16, which in combination with vertical web 17 define hitch channel 15 for receiving crossbar 102 of hitch 100. Additionally, cover segment 12 has an upper flange 18 and a corresponding lower flange 20, which are substantially coplanar with web 17 and extend above and below upper and lower legs 14 and 16, respectively. Upper and lower flanges 18 and 20 cooperate to provide means for receiving accessories to be mounted upon cover segments 12. As shown further in FIG. 1, cover segment 12 may have a plurality of attachment holes 24 positioned at spaced intervals proximate to the free ends of upper and lower legs 14 and 16, although other attachment means may also be used as noted hereinafter (in which event the holes 24 could be omitted).

FIG. 3 discloses an end view of a 4-pin connector adaptor 28 which is one of the accessories contemplated in the preferred embodiment. Adaptor 28, like cover segment 12, is also preferably a segment of a plastic extrusion, and comprises a vertical web 30 having L-shaped upper and lower lips 32 and 34 defining upper and lower recesses 36 and 38. Upper and lower recesses 36 and 38 are vertically oriented and oppositely disposed, one from the other, such that flanges 18 and 20 of cover segment 12 are closely received by slots 36 and 38, respectively, for the mounting of adaptor 28 on cover segment 12. Adaptor 28 includes an integral connector mount 40 on an opposite side of web 30, connector mount 40 also having an elongated aperture 42 therethrough. Aperture 42 is configured to receive a 4-pin standard receptacle, also known as a "flat four." An upwardly oriented arm 44 is positioned on web 30 subjacent to connector mount 40 and defines in combination with web 30 a slot for the purpose of retaining and controlling the cable 46.

FIG. 4 discloses another accessory contemplated by the preferred embodiment, i.e. a wire harness retainer 50. Retainer 50 may also be a segment of a plastic extrusion, and includes a vertical web 52 having at upper and lower ends, respectively, upper and lower lips 54 and 56 which define upper and lower slots 58 and 60. Upper and lower slots 58 and 60 receive flanges 18 and 20 of cover segment 12 in a manner similar to that of connector adaptor 28. Wire harness retainer 50 has, extending from an opposite side of vertical web 52, opposing resilient fingers 62 defining a C-shaped harness-receiving recess 64 therebetween.

FIGS. 5–10 inclusive disclose further details of another embodiment of a connector mounting accessory, i.e., the multi-pin (e.g., 7-way) connector adaptor 70 shown generally in FIG. 1. Adaptor 70 is preferably a one-piece member made as a plastic molding and, like adapters 28 and 50 referred to above, also preferably has a vertical web 72 having upper and lower opposed lips 74 and 76 defining upper and lower slots 78 and 80 for receiving flanges 18 and 20 of cover segment 12. Adapter 70 is much larger and more extensive than components 28 and 50, however, i.e., it extends laterally along cover 12 considerably further. Connector adapter 70 comprises a shell-like housing 82 formed on the side of web 72 opposite slots 78 and 80, which includes a substantially flat mount face 83 on one end (the left, as seen in FIG. 1) extending angularly away from web 72 and having a connector aperture 84 therethrough which is configured to receive a standard 7-way or other multiple-contact electrical receptacle. Housing 82 extends laterally from face 83 the remaining length of adaptor 70 and forms an enclosure to shield the connector-wire harness termination and interface from road and environment elements. Adaptor 70 may also have a 4-pin connector storage mount 86 affixed to or formed on the outside of housing 82 for the storage of the vehicle-mounted 4-pin "flat four" connector. Mount 86 has an aperture 88 therethrough, which closely receives and bindingly retains the 4-pin connector within storage mount 86 when this connector is not in use.

Adaptor 70 further includes a wiring harness or cable-receiving and retaining structure 110 which is spaced along the outside thereof a short distance from the four-pin connector storage mount 86 referred to above (FIGS. 6, 7, 8, and 10). Structure 110 includes a pair of curved, downwardly tapering, resilient walls 112, 114 which define a slot 116 therebetween leading to an enlarged opening 118 disposed in an angular wall segment 120 leading to an end wall 122 opposite face 83, in which a generally semicircular opening 124 is formed.

In use, referring back to FIG. 1, a user can easily trim cover segment 12 to fit a portion or the entire length of crossbar 102 of hitch 100 to provide a protective and aesthetically compatible cover for crossbar 102 (in which regard, the cover segments 12 may if desired be given a selected color or other surface treatment). Cover segment 12 is placed over crossbar 102, such that crossbar 102 is received in hitch channel 15 of cover segment 12. As so positioned, the flanges or legs 14, 16 preferably extend beyond the rear side of crossbar 102, such that cover segment 12 may be retained in place upon crossbar 102 by self-locking tie-straps 26 extending through pairs of vertically aligned attachment holes 24 in flanges 14 and 16 and across the rear side of crossbar 102. It will be understood that other means of retention, other than tie-straps 26, can also be used; e.g., other types of mechanical fasteners such as retention screws 90 mentioned above, adhesives, tight frictional engagements like press-fit arrangements or shrink-fits, etc. After the cover segments 12 are secured in place, one or more of the aforementioned accessories, adapters 28 and 70, and retainer 50, can be engaged upon cover segment flanges 18 and 20 and slid therealong to any desired position along their length. Accessories 28, 50, and 70 can then be affixed in a desired position by engaging a screw 90 in hole 92 proximate to upper flange area 18, such that when screw 90 is torqued, it bears upon flange 18 thereby retaining the accessory in fixed relationship to cover segment 12.

The particular structure and features of the accessory device 70 noted above in connection with FIGS. 6–10 inclusive are shown and described in order to illustrate the most preferred embodiment and best mode presently contemplated for implementing such a device, although it is to be noted that most such particular features are considered to be desirable although perhaps not essential. As will be apparent, in its most basic nature the accessory device 70 principally constitutes an aesthetically appealing and protective mount and cover for the connectors contemplated for use in connection therewith, together with convenient and effective retainers or snubbing means for their associated cable or wiring harnesses, made to be slidably or otherwise repositionable along the cover segments 12 at various desired locations. Usage of the particular features illustrated and described will largely be apparent, or have already been described, but it will be noted here that the 7-pin or other multiple-connector coupling be mounted therein typically has a faceplate or peripheral flange which is secured in place against face 83 of housing 82, using the indicated screw holes 94 or the like (FIG. 5), after inserting the associated cable end through connector aperture 84 and passing it outwardly through the aforementioned opening 124 in end wall 122. The "flat four" connector retainable in recess 88 has its attached wiring harness inserted through opening 118 in angular face 120 and forced downwardly through slot 116, by momentarily deflecting the resilient associated walls 112, 114. A convenient way of accomplishing this is to first double-up (loop) a portion of such harness and insert it through opening 118, and then simply pull the cable forward, from a point further along the length of the harness, whereupon the portion of the harness between the loop and the pulling point is forced downwardly through slot 116 as its side walls 112, 114 are momentarily flexed downward. The sharp forward edges 111 (FIG. 8) of opening 118 facilitate this by catching the top of the loop and keeping it from simply pulling back out of this opening. After this, any excess cable or harness left inside housing 82 may readily be pulled back out through opening 118 by pulling the harness rearwardly (i.e., left as seen in FIG. 8).

In further connection with use of the preferred structure 70 illustrated, it is to be noted that the curved wall extending over and generally defining storage mount 86 preferably has a rearwardly projecting edge extremity 87 (best seen in FIG. 8), which hoods the entrance to recess 88 and helps to keep moisture and foreign objects or substances from entering or becoming attached to the connectors inserted into this recess for retention. Preferably, the opposite end of passage 88, adjacent front face 83, is covered by a thin sheet of protective plastic such as Mylar (not shown) to keep moisture and foreign substances from entering recess 88 from this side. In this regard, recess 88 is shown as extending completely through mount 86 simply because that is the most convenient way of manufacturing the apparatus by molding.

It is to be pointed out once again that while the foregoing disclosure addresses a particular preferred embodiment, and best mode, the particular apparatus described and the various detailed aspects thereof noted are regarded as pertaining to only the most preferred version of the invention and as merely illustrating the principles and concepts involved in the invention, other embodiments and versions of the invention no doubt being feasible and potentially appropriate in other circumstances. It should, therefore, be understood that the foregoing description of a particular preferred embodiment is provided for purposes and illustration, and not as a measure of the invention, whose scope is to be defined solely by reference to the ensuing claims. Embodiments of the invention differing from those set forth above which nonetheless utilize the underlying concepts of the invention and incorporates its spirit should, therefore, be considered as within the scope of the claims appended below, unless such claims by their language specifically state otherwise.

The invention claimed is:

1. A trailer hitch cover for use with a vehicle-mounted trailer towing hitch having a crossbar, said trailer hitch cover comprising:

a cover segment adapted to at least partially cover the trailer hitch crossbar, said cover segment comprising a channel-section having a pair of substantially parallel legs and an interconnecting web defining a slot adapted for receiving the hitch crossbar and including an elongated accessory mount extending along said cover segment and providing support for an accessory at a selected one of a plurality of positions on said accessory mount;

a fastener adapted for securing said cover segment to the trailer hitch crossbar;

a pair of cantilevered projecting flanges defining free edges and extending along said web spaced from and generally parallel to one another to form said accessory mount.

2. The trailer hitch cover of claim 1 wherein said projecting flanges comprise integral edge portions of said web.

3. A trailer hitch cover system for use with vehicle-mounted trailer towing hitches having a crossbar, said trailer hitch cover system comprising:

at least one cover segment adapted to at least partially cover a trailer hitch crossbar, said cover segment including an accessory mount configured to simultaneously support a plurality of accessories;

a securement element adapted for attaching said cover segment to a trailer hitch crossbar;

at least one accessory mountable by engaging said accessory mount;

said at least one cover segment having a channel-like cross-section including two substantially parallel and mutually spaced legs and an interconnecting web, said legs and web defining a slot adapted for receiving the hitch crossbar; and a ridge defining a free edge and extending along the outside of said channel-like cross-section to form said accessory mount.

4. A trailer hitch cover system for use with vehicle-mounted trailer towing hitches having a crossbar, said trailer hitch cover system comprising:

at least one cover segment adapted to at least partially cover a trailer hitch crossbar, said cover segment including an accessory mount;

a securement element adapted for attaching said cover segment to a trailer hitch crossbar;

at least one accessory mountable by engaging said accessory mount;

said at least one cover segment having a channel-like cross-section including two substantially parallel and mutually spaced legs and an interconnecting web, said legs and web defining a slot adapted for receiving the hitch crossbar;

a ridge extending along the outside of said channel-like cross-section to form said accessory mount;

said at least one accessory comprising a central vertical web having an upper and a lower end; and at least one lip extending laterally from said upper and lower ends, said lip engaging said ridge.

5. The trailer hitch cover system of claim 4, including a pair of said engaging ridges and lips spaced from one another on the outside of said channel-like cross-section.

6. The trailer hitch cover system of claim 4 wherein said accessory further comprises a connector mount formed to receive a multiple-pin electrical connector.

7. The trailer hitch cover system of claim 5 wherein said connector mount further includes a storage receptacle for a multiple-contact electrical receptacle.

8. The trailer hitch cover system of claim 4 wherein said at least one accessory further comprises a connector mount formed to receive a flat-type multi-contact electrical receptacle.

9. A trailer hitch cover system for use with vehicle-mounted trailer towing hitches having a crossbar, said trailer hitch cover system comprising:

at least one cover segment adapted to at least partially cover a trailer hitch crossbar, said cover segment including an accessory mount;

a securement element adapted for attaching said cover segment to a trailer hitch crossbar;

at least one accessory mountable by engaging said accessory mount;

said at least one cover segment having a channel-like cross-section including two substantially parallel and mutually spaced legs and an interconnecting web, said legs and web defining a slot adapted for receiving the hitch crossbar;

a ridge extending along the outside of said channel-like cross-section to form said accessory mount; and
wherein said at least one accessory is a cable retainer comprising
a pair of opposing fingers extending laterally from said vertical web, said fingers defining a slot therebetween adapted for receiving an electrical harness therein.

10. The trailer hitch cover of claim 9 including a cantilevered projecting flange defining a free edge and extending along said web to form said accessory mount.

11. A trailer hitch cover for use with vehicle-mounted trailer towing hitches having a crossbar, comprising:
an elongated cover having a substantially uniform cross sectional shape along the length of the cover, said cross sectional shape conforming to the crossbar to cover the same, said cover including a connector for securing said cover to a crossbar, said cover made of a cutable material permitting trimming of said cover to a length corresponding to the portion of the crossbar to be covered.

\* \* \* \* \*